US012592000B2

(12) United States Patent
Ruben et al.

(10) Patent No.: US 12,592,000 B2
(45) Date of Patent: Mar. 31, 2026

(54) SYSTEMS AND METHODS FOR PROCESSING DIGITAL IMAGES TO ADAPT TO COLOR VISION DEFICIENCY

(71) Applicant: PAIGE.AI, INC., New York, NY (US)

(72) Inventors: Kristin Ruben, Boston, MA (US); Kyle Ondy, Millstone Township, NJ (US); Christopher Kanan, Pittsford, NY (US)

(73) Assignee: Paige.AI, Inc., New York, NY (US)

( * ) Notice: Subject to any disclaimer, the term of this patent is extended or adjusted under 35 U.S.C. 154(b) by 674 days.

(21) Appl. No.: 18/060,358

(22) Filed: Nov. 30, 2022

(65) Prior Publication Data

US 2023/0196622 A1     Jun. 22, 2023

Related U.S. Application Data

(60) Provisional application No. 63/291,872, filed on Dec. 20, 2021.

(51) Int. Cl.
G06T 7/90     (2017.01)
G06T 7/00     (2017.01)

(52) U.S. Cl.
CPC .............. G06T 7/90 (2017.01); G06T 7/0012 (2013.01); G06T 2207/10056 (2013.01); G06T 2207/20081 (2013.01)

(58) Field of Classification Search
None
See application file for complete search history.

(56) References Cited

U.S. PATENT DOCUMENTS

| | | | |
|---|---|---|---|
| 2014/0340644 A1 | 11/2014 | Haine et al. | |
| 2017/0206625 A1* | 7/2017 | Fainstain | ................. G06T 7/20 |
| 2021/0319219 A1 | 10/2021 | Kale | |

OTHER PUBLICATIONS

Bautista, et al, "Staining Correction in Digital Pathology by Utilizing a Dye Amount Table", J Digit Imaging, pp. 283-294, 2015 (Year: 2015).*
Celis et al, "Blind colour separation of H&E stained histological images by linearly transforming the colour space", Journal of Microscopy, pp. 377-388, 2015 (Year: 2015).*

(Continued)

*Primary Examiner* — Edward Park
(74) *Attorney, Agent, or Firm* — Bookoff McAndrews, PLLC

(57)     ABSTRACT

A computer-implemented method for processing medical images, the method including receiving one or more of medical images of at least one pathology specimen, the pathology specimen being associated with a patient, wherein the medical image is a stained histology image. The method may further include receiving a stain type associated with the one or more medical images and identifying a color vision deficiency for one or more users. Next the method may include identifying a pixel transformation for the one or more medical images based on the stain type and color vision deficiency of the one or more users. Next the method may include applying a pixel transformation to each pixel within the one or more medical images. Lastly the method may include displaying the transformed one or more medical images to the one or more users.

20 Claims, 8 Drawing Sheets
(2 of 8 Drawing Sheet(s) Filed in Color)

(56) References Cited

OTHER PUBLICATIONS

Vahadane et al., "Structure-Preserving Color Normalization and Sparse Stain Separation for Histological Images", IEEE, pp. 1962-1971, 2016 (Year: 2016).*

Elrefaei, "Smartphone Based Image Color Correction for Color Blindness", iJIM, pp. 104-120, 2018 (Year: 2018).*

Landini, et al., "Digital enhancement of haematoxylin- and eosin-stained histological images for red-green colour-blind observers", Journal of Microscopy, pp. 293-301, 2009 (Year: 2009).*

Jang et al, "Visual Contents Adaptation for Color Vision Deficiency using Customized ICC Profile", DRAT, 2010 (Year: 2010).*

Bautista, Pinky A., et al. "Staining correction in digital pathology by utilizing a dye amount table." Journal of digital maging 28.3 (2015): 283-294.

Yu Ma, et al. "Color discrimination enhancement for dichromats using self-organization color transformation." Information Sciences, vol. 179, Issue 6 (2009): 830-843.

Landini, Gabriel, et al. "Digital enhancement of haematoxylin-and eosin-stained histological images for red-green colour-blind observers." Journal of microscopy 234.3 (Jun. 2009): 293-301.

Lin, Huei-Yung, et al. "Improving discrimination in color vision deficiency by image re-coloring." Sensors 19.10 (May 15, 2019): 2250.

* cited by examiner

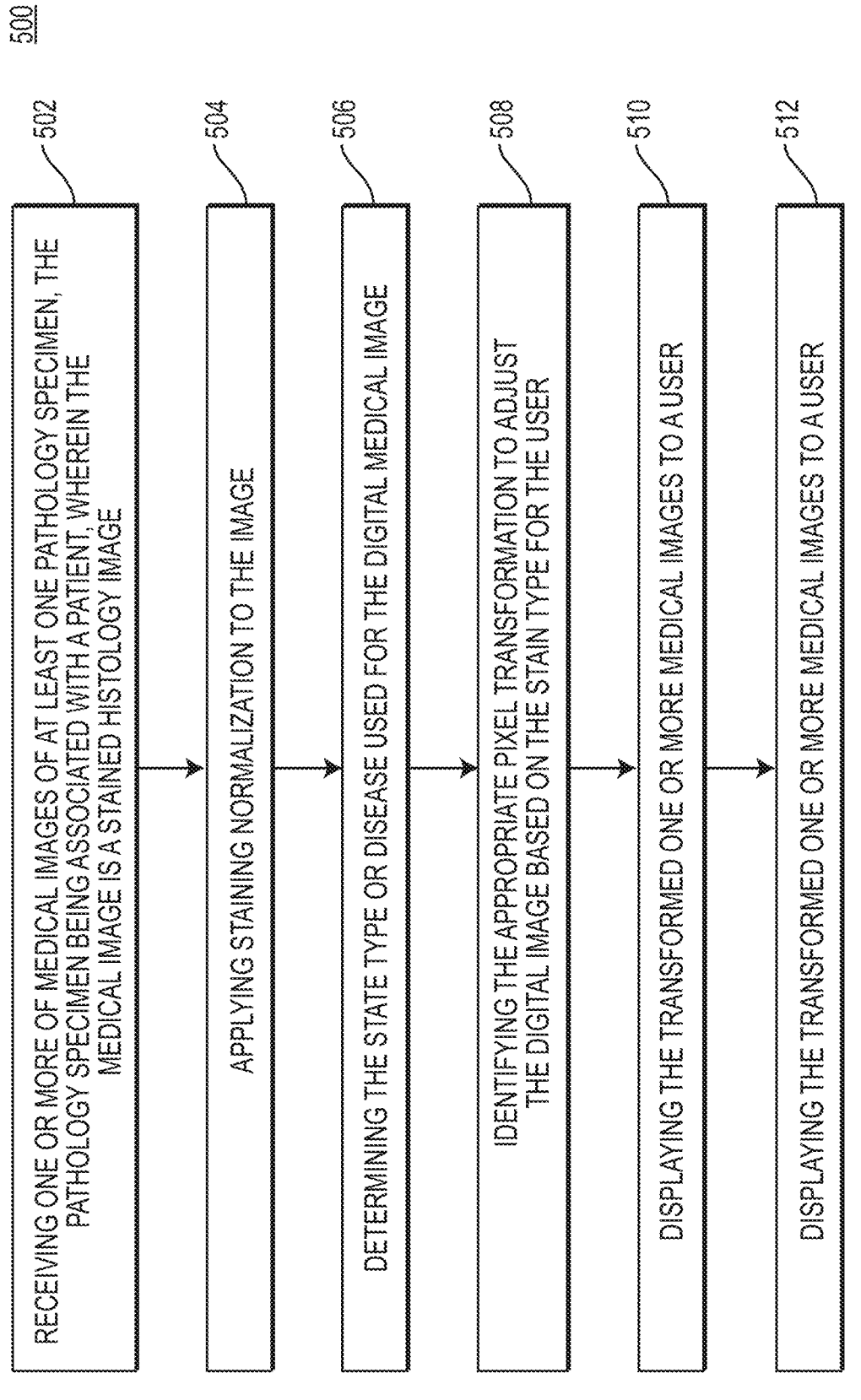

500

502 RECEIVING ONE OR MORE OF MEDICAL IMAGES OF AT LEAST ONE PATHOLOGY SPECIMEN, THE PATHOLOGY SPECIMEN BEING ASSOCIATED WITH A PATIENT, WHEREIN THE MEDICAL IMAGE IS A STAINED HISTOLOGY IMAGE

504 APPLYING STAINING NORMALIZATION TO THE IMAGE

506 DETERMINING THE STATE TYPE OR DISEASE USED FOR THE DIGITAL MEDICAL IMAGE

508 IDENTIFYING THE APPROPRIATE PIXEL TRANSFORMATION TO ADJUST THE DIGITAL IMAGE BASED ON THE STAIN TYPE FOR THE USER

510 DISPLAYING THE TRANSFORMED ONE OR MORE MEDICAL IMAGES TO A USER

512 DISPLAYING THE TRANSFORMED ONE OR MORE MEDICAL IMAGES TO A USER

*FIG. 5*

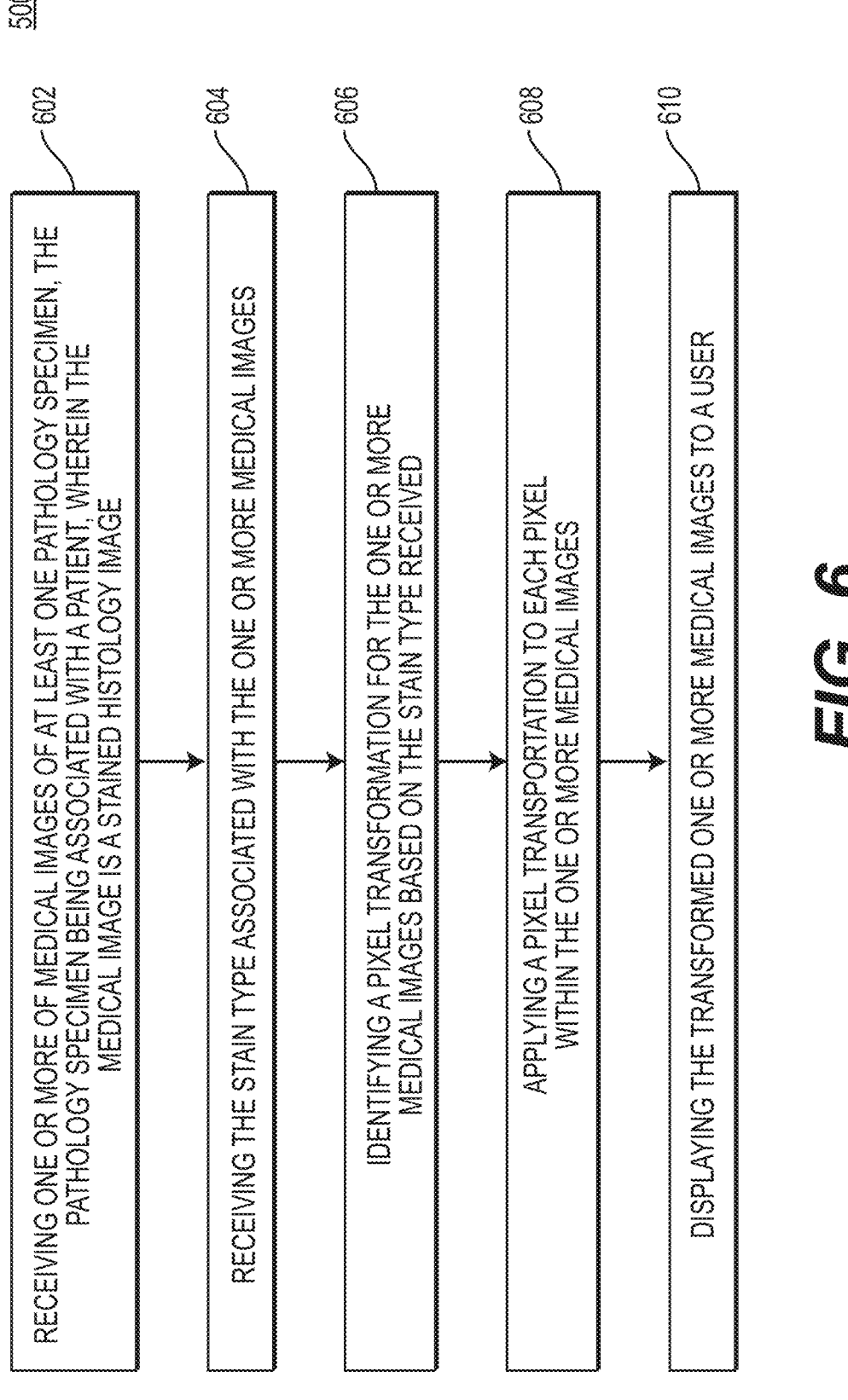

600

602 — RECEIVING ONE OR MORE OF MEDICAL IMAGES OF AT LEAST ONE PATHOLOGY SPECIMEN, THE PATHOLOGY SPECIMEN BEING ASSOCIATED WITH A PATIENT, WHEREIN THE MEDICAL IMAGE IS A STAINED HISTOLOGY IMAGE

604 — RECEIVING THE STAIN TYPE ASSOCIATED WITH THE ONE OR MORE MEDICAL IMAGES

606 — IDENTIFYING A PIXEL TRANSFORMATION FOR THE ONE OR MORE MEDICAL IMAGES BASED ON THE STAIN TYPE RECEIVED

608 — APPLYING A PIXEL TRANSPORTATION TO EACH PIXEL WITHIN THE ONE OR MORE MEDICAL IMAGES

610 — DISPLAYING THE TRANSFORMED ONE OR MORE MEDICAL IMAGES TO A USER

*FIG. 6*

SYSTEMS AND METHODS FOR PROCESSING DIGITAL IMAGES TO ADAPT TO COLOR VISION DEFICIENCY

RELATED APPLICATION(S)

This application claims priority to U.S. Provisional Application No. 63/291,872 filed Dec. 20, 2021, the entire disclosure of which is hereby incorporated herein by reference in its entirety.

FIELD OF THE DISCLOSURE

Various embodiments of the present disclosure pertain generally to systems and methods for image processing. More specifically, particular embodiments of the present disclosure relate to systems and methods for processing digital images to adapt to color vision deficiency.

BACKGROUND

Color blindness may be defined as the decreased ability to see color or differences in color. Most forms of color blindness may impair performance of a majority of tasks in a minimal way; however, certain tasks may require significant capabilities to discriminate among colors. One such task may be the interpretation of stained pathology slides for the diagnosis of disease, which happens to occur in both veterinary and human medical environments. Approximately 8% of men and 0.4% of women experience congenital colorblindness due to lacking various photoreceptor cell types (cone cells). Moreover, achromatopsia, the complete loss of color perception, can be acquired via other means, such as due to stroke or other forms of brain damage, especially the brain region known as V4.

Having impaired color vision may impair an individual's ability to learn pathology. Further, impaired color vision may negatively impact medical professionals ability to enter the fields of human pathology or veterinary pathology. Additionally, color impaired vision may affect the ability for biologists to interpret microscopy imagery. From an educational perspective, medical students with impaired color vision may have their ability to learn the pathology curriculum diminished. Moreover, the acquisition of achromatopsia could be a devastating disability for current practicing professionals because they may no longer be able to utilize their training to interpret histology images.

The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY

According to certain aspects of the present disclosure, systems and methods are disclosed for processing electronic medical images, comprising: receiving one or more of medical images of at least one pathology specimen, the pathology specimen being associated with a patient, wherein the medical image is a stained histology image; receiving a stain type associated with the one or more medical images; identifying a color vision deficiency for one or more users; identifying a pixel transformation for the one or more medical images based on the stain type and color vision deficiency of the one or more users; applying a pixel transformation to each pixel within the one or more medical images; and displaying the transformed one or more medical images to the one or more users.

A system for processing electronic digital medical images, the system including: receiving one or more of medical images of at least one pathology specimen, the pathology specimen being associated with a patient, wherein the medical image is a stained histology image; receiving a stain type associated with the one or more medical images; identifying a color vision deficiency for one or more users; identifying a pixel transformation for the one or more medical images based on the stain type and color vision deficiency of the one or more users; applying a pixel transformation to each pixel within the one or more medical images; and displaying the transformed one or more medical images to the one or more users.

A non-transitory computer-readable medium storing instructions that, when executed by a processor, perform operations processing electronic digital medical images, the operations including: receiving one or more of medical images of at least one pathology specimen, the pathology specimen being associated with a patient, wherein the medical image is a stained histology image; receiving a stain type associated with the one or more medical images; identifying a color vision deficiency for one or more users; identifying a pixel transformation for the one or more medical images based on the stain type and color vision deficiency of the one or more users; applying a pixel transformation to each pixel within the one or more medical images; and displaying the transformed one or more medical images to the one or more users.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments. The patent or application file contains at least one drawing executed in color. Copies of this patent or patent application publication with color drawing(s) will be provided by the Office upon request and payment of the necessary fee.

FIG. 5 is a flowchart illustrating an example method for adapting the pixel colors of one or more digital, according to techniques presented herein.

FIG. 6 is a flowchart illustrating an example method for determining a pixel transformation for one or more users with a color impairment according to techniques presented herein.

DESCRIPTION OF THE EMBODIMENTS

Figure 1A:
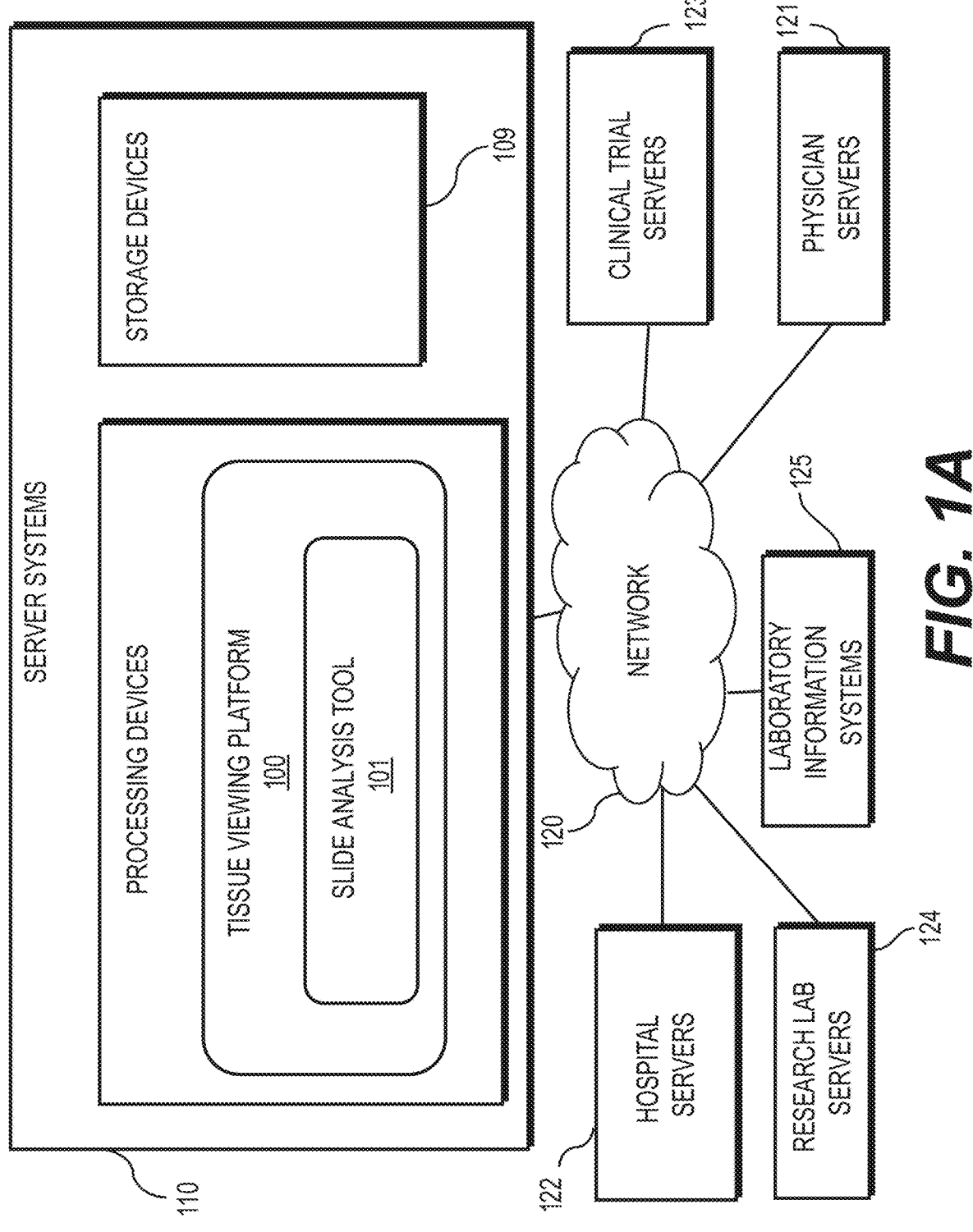
FIG. 1A illustrates an exemplary block diagram of a system and network for processing images, according to techniques presented herein.

Reference will now be made in detail to the exemplary embodiments of the present disclosure, examples of which are illustrated in the accompanying drawings. Wherever possible, the same reference numbers will be used throughout the drawings to refer to the same or like parts.

The systems, devices, and methods disclosed herein are described in detail by way of examples and with reference to the figures. The examples discussed herein are examples only and are provided to assist in the explanation of the apparatuses, devices, systems, and methods described herein. None of the features or components shown in the drawings or discussed below should be taken as mandatory for any specific implementation of any of these devices, systems, or methods unless specifically designated as mandatory.

Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

As used herein, the term "exemplary" is used in the sense of "example," rather than "ideal." Moreover, the terms "a" and "an" herein do not denote a limitation of quantity, but rather denote the presence of one or more of the referenced items.

As used herein, a "machine learning model" generally encompasses instructions, data, and/or a model configured to receive input, and apply one or more of a weight, bias, classification, or analysis on the input to generate an output. The output may include, for example, a classification of the input, an analysis based on the input, a design, process, prediction, or recommendation associated with the input, or any other suitable type of output. A machine learning model is generally trained using training data, e.g., experiential data and/or samples of input data, which are fed into the model in order to establish, tune, or modify one or more aspects of the model, e.g., the weights, biases, criteria for forming classifications or clusters, or the like. Deep learning techniques may also be employed. Aspects of a machine learning model may operate on an input linearly, in parallel, via a network (e.g., a neural network), or via any suitable configuration.

The execution of the machine learning model may include deployment of one or more machine learning techniques, such as linear regression, logistical regression, random forest, gradient boosted machine (GBM), deep learning, and/or a deep neural network. Supervised and/or unsupervised training may be employed. For example, supervised learning may include providing training data and labels corresponding to the training data, e.g., as ground truth. Unsupervised approaches may include clustering, classification or the like. K-means clustering or K-Nearest Neighbors may also be used, which may be supervised or unsupervised. Combinations of K-Nearest Neighbors and an unsupervised cluster technique may also be used. Any suitable type of training may be used, e.g., stochastic, gradient boosted, random seeded, recursive, epoch or batch-based, etc.

Histopathology refers to the study of a specimen that has been placed onto a slide. For example, a digital pathology image may be comprised of a digitized image of a microscope slide containing the specimen (e.g., a smear). One method a pathologist may use to analyze an image on a slide is to identify nuclei and classify whether a nucleus is normal (e.g., benign) or abnormal (e.g., malignant). To assist pathologists in identifying and classifying nuclei, histological stains may be used to make cells visible. Many dye-based staining systems have been developed, including periodic acid-Schiff reaction, Masson's trichrome, nissl and methylene blue, and Haemotoxylin and Eosin (H&E). For medical diagnosis, H&E is a widely used dye-based method, with hematoxylin staining cell nuclei blue, eosin staining cytoplasm and extracellular matrix pink, and other tissue regions taking on variations of these colors.

Staining aids in creating visible contrast of the different tissue structures for differentiation by a pathologist. During this process, one or more types of chemical substances (e.g., stains or dyes) are attached to different compounds in the tissue delineating different cellular structures. Different types of stains may highlight different structures. Therefore, pathologists examining a stained slide may interpret or analyze the stains differently. Depending on a disease and its underlying behavior, one stain or a combination of stains may be preferable over others for use in diagnostic detection. Although standard protocols for using these stains are often in place, protocols vary per institution and overstaining or understaining of tissue may occur, which may potentially cause diagnostic information or indicators to be obscured. For example, color variations resulting from non-uniform staining between slides may cause one image to look pinker among other images that a pathologist has been reviewing during a day. Such out of distribution images might be hard for the pathologist to investigate as separating different structures might be confusing. For instance, a main characteristic of lymphocytes in Hematoxylin and Eosin (H&E) stained images is their dark purple color; however, in some poorly stained images they might have similar color as other cells. Moreover, multiple stains are commonly used together for highlighting several structures of interest in the tissue, e.g., tissue that is stained with both hematoxylin and eosin, which may further exacerbate potential problems caused by overstaining or understaining.

When pathologists view slides with a traditional microscope, they do not have the ability to alter attributes (e.g., characteristics or properties) of the image produced by the microscope beyond magnification. However, when whole slide imaging is used to scan images of the slides for generating digital whole slide images (WSIs), image processing and AI-enabled tools may be utilized for adjusting a color, an amount of a particular stain, a brightness, a sharpness, and/or a contrast, among other attribute adjustments to the whole slide images. Such adjustments may enable pathologists to better analyze tissue samples from human or animal patients by allowing them to adjust the image attributes in semantically meaningful ways (e.g., to normalize color across a population of slides being viewed, correct for overstaining or understaining, enhance differentiation of structures, remove artifacts, etc.).

Histopathology may require a human, who may be may be trained as a biologist, medical pathologist, or veterinary pathologist, to interpret stained slides of tissues from plants, animals, or humans. Not every human has the same visual perception abilities due to colorblindness or other issues that affect their ability to discriminate among different colors. This may make it challenging for people with deficient color vision to acquire the skills of a pathologist, especially for skills related to medical diagnosis. Techniques presented herein address this issue by transforming digital histopathology images into alternative color representations. This may enable the histopathology images to be more accurately interpreted by people with deficient color vision.

Techniques discussed herein may use AI technology, machine learning, and image processing tools to enable pathologists to adjust digital images according to their needs. Techniques presented herein may be used as part of a visualization software that pathologists use to view the digital whole slide images in their routine workflow. Techniques presented herein may provide for methods of automatically altering pathology images to alternative color representations based on a user's deficiency in color vision.

FIG. 1A illustrates a block diagram of a system and network for adjusting the pixels of one or more images, using machine learning, according to an exemplary embodiment of the present disclosure.

Specifically, FIG. 1A illustrates an electronic network 120 that may be connected to servers at hospitals, laboratories, and/or doctors' offices, etc. For example, physician servers 121, hospital servers 122, clinical trial servers 123, research lab servers 124, and/or laboratory information systems 125, etc., may each be connected to an electronic network 120, such as the Internet, through one or more computers, servers, and/or handheld mobile devices. According to an exemplary embodiment of the present disclosure, the electronic network 120 may also be connected to server systems 110, which may include processing devices that are configured to implement a tissue viewing platform 100, which includes a slide analysis tool 101 for identifying a pixel transformation and applying a pixel transformation to digital pathology image(s), and using machine learning to update the pixels, according to an exemplary embodiment of the present disclosure.

The physician servers 121, hospital servers 122, clinical trial servers 123, research lab servers 124, and/or laboratory information systems 125 may create or otherwise obtain images of one or more patients' cytology specimen(s), histopathology specimen(s), slide(s) of the cytology specimen(s), digitized images of the slide(s) of the histopathology specimen(s), or any combination thereof. The physician servers 121, hospital servers 122, clinical trial servers 123, research lab servers 124, and/or laboratory information systems 125 may also obtain any combination of patient-specific information, such as age, medical history, cancer treatment history, family history, past biopsy or cytology information, etc. The physician servers 121, hospital servers 122, clinical trial servers 123, research lab servers 124, and/or laboratory information systems 125 may transmit digitized slide images and/or patient-specific information to server systems 110 over the electronic network 120. Server systems 110 may include one or more storage devices 109 for storing images and data received from at least one of the physician servers 121, hospital servers 122, clinical trial servers 123, research lab servers 124, and/or laboratory information systems 125. Server systems 110 may also include processing devices for processing images and data stored in the one or more storage devices 109. Server systems 110 may further include one or more machine learning tool(s) or capabilities. For example, the processing devices may include a machine learning tool for a tissue viewing platform 100, according to one embodiment. Alternatively or in addition, the present disclosure (or portions of the system and methods of the present disclosure) may be performed on a local processing device (e.g., a laptop).

The physician servers 121, hospital servers 122, clinical trial servers 123, research lab servers 124, and/or laboratory information systems 125 refer to systems used by pathologists for reviewing the images of the slides. In hospital settings, tissue type information may be stored in one of the laboratory information systems 125.

Figure 1B:
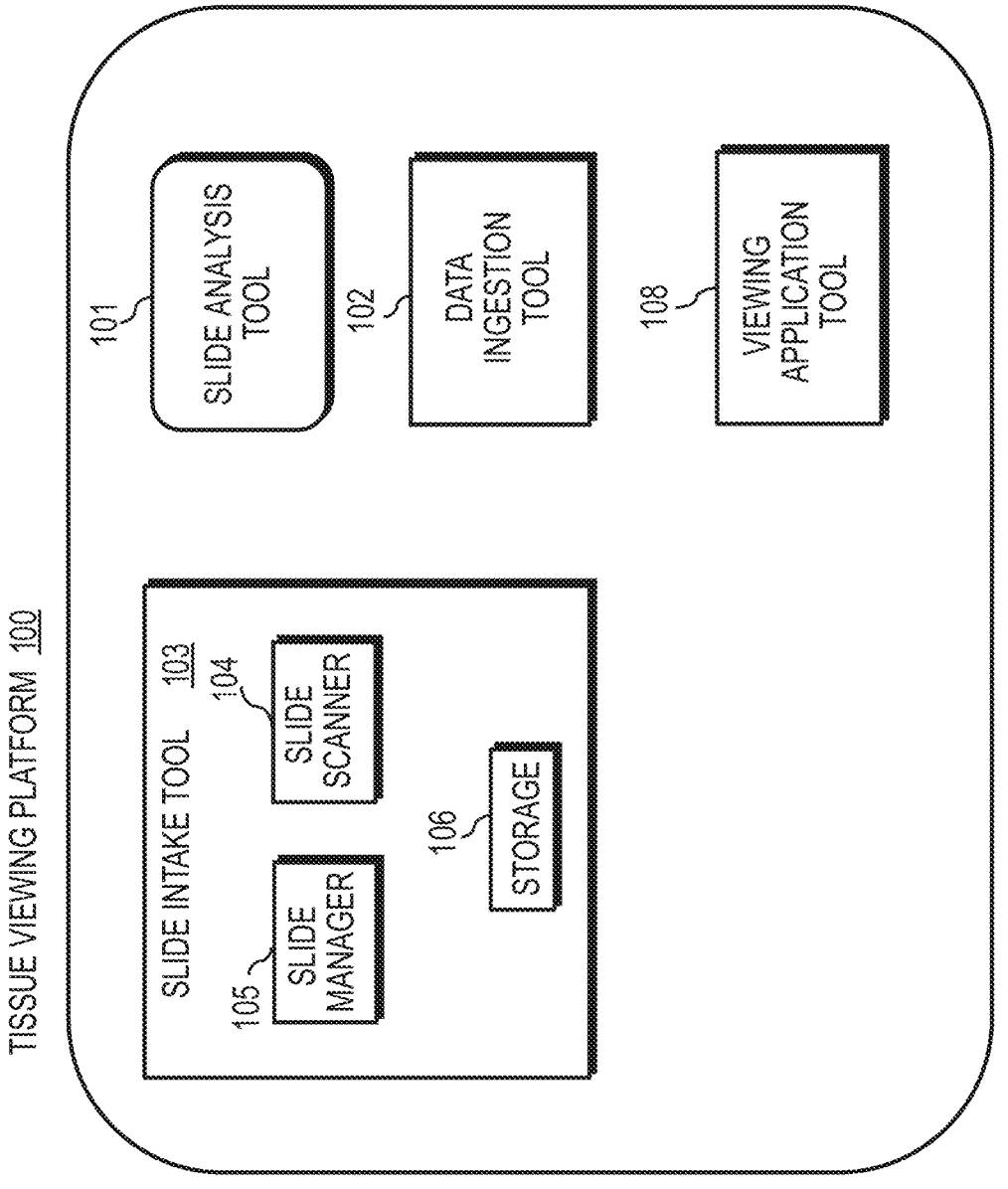
FIG. 1B illustrates an exemplary block diagram of a tissue viewing platform according to techniques presented herein.

FIG. 1B illustrates an exemplary block diagram of a tissue viewing platform 100, using machine learning. For example, the tissue viewing platform 100 may include a slide analysis tool 101, a data ingestion tool 102, a slide intake tool 103, a slide scanner 104, a slide manager 105, a storage 106, and a viewing application tool 108.

The slide analysis tool 101, as described below, refers to a process and system for processing digital images associated with a tissue specimen, and using machine learning to analyze a slide, according to an exemplary embodiment.

The data ingestion tool 102 refers to a process and system for facilitating a transfer of the digital pathology images to the various tools, modules, components, and devices that are used for classifying and processing the digital pathology images, according to an exemplary embodiment.

The slide intake tool 103 refers to a process and system for scanning pathology images and converting them into a digital form, according to an exemplary embodiment. The slides may be scanned with slide scanner 104, and the slide manager 105 may process the images on the slides into digitized pathology images and store the digitized images in storage 106.

The viewing application tool 108 refers to a process and system for providing a user (e.g., a pathologist) with specimen property or image property information pertaining to digital pathology image(s), according to an exemplary embodiment. The information may be provided through various output interfaces (e.g., a screen, a monitor, a storage device, and/or a web browser, etc.).

The slide analysis tool 101, and each of its components, may transmit and/or receive digitized slide images and/or patient information to server systems 110, physician servers 121, hospital servers 122, clinical trial servers 123, research lab servers 124, and/or laboratory information systems 125 over an electronic network 120. Further, server systems 110 may include one or more storage devices 109 for storing images and data received from at least one of the slide analysis tool 101, the data ingestion tool 102, the slide intake tool 103, the slide scanner 104, the slide manager 105, and viewing application tool 108. Server systems 110 may also include processing devices for processing images and data stored in the storage devices. Server systems 110 may further include one or more machine learning tool(s) or capabilities, e.g., due to the processing devices. Alternatively or in addition, the present disclosure (or portions of the system and methods of the present disclosure) may be performed on a local processing device (e.g., a laptop).

Any of the above devices, tools and modules may be located on a device that may be connected to an electronic network 120, such as the Internet or a cloud service provider, through one or more computers, servers, and/or handheld mobile devices.

Figure 1C:
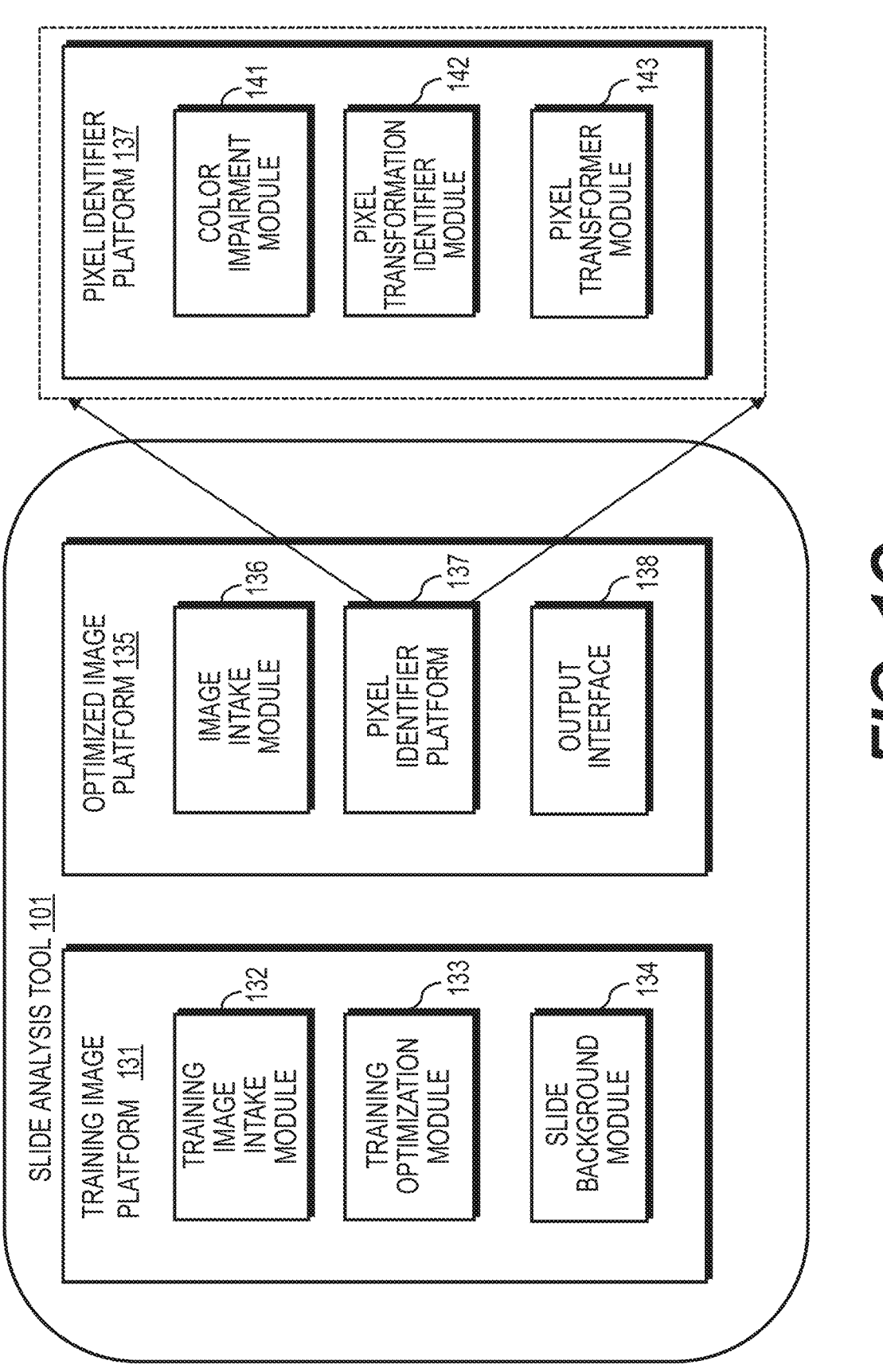
FIG. 1C illustrates an exemplary block diagram of a slide analysis tool, according to techniques presented herein.

FIG. 1C illustrates an exemplary block diagram of a slide analysis tool 101, according to an exemplary embodiment of the present disclosure. The slide analysis tool may include a training image platform 131 and/or an optimized image platform 135 and or a pixel identifier platform 137.

The training image platform 131, according to one embodiment, may create or receive training images that are used to train a machine learning system to effectively analyze and classify digital pathology images. For example, the training images may be received from any one or any combination of the server systems 110, physician servers 121, hospital servers 122, clinical trial servers 123, research lab servers 124, and/or laboratory information systems 125. Images used for training may come from real sources (e.g., humans, animals, etc.) or may come from synthetic sources (e.g., graphics rendering engines, 3D models, etc.). Examples of digital pathology images may include (a) digitized slides stained with a variety of stains, such as (but not limited to) H&E, Hematoxylin alone, IHC, molecular pathology, etc.; and/or (b) digitized image samples from a 3D imaging device, such as micro-CT.

The training image intake module 132 may create or receive a dataset comprising one or more training images corresponding to either or both of images of a human tissue and images that are graphically rendered. For example, the training images may be received from any one or any combination of the server systems 110, physician servers 121, and/or laboratory information systems 125. This dataset may be kept on a digital storage device. The training optimization module 133 may intake training data related to optimized pixel colors based on one or more color impairments. For example, the training optimization module 133 may intake full WSIs, or may intake one or more tiles of WSIs. The training optimization module 133 may include the ability to break an inputted WSI into tiles to perform further analysis of individual tiles of a WSI. The training optimization module 133 may further receive datasets that includes information as to what type of color blindness or color impairment that a user has. The slide background module 134 may analyze images of tissues and determine a background within a digital pathology image. It is useful to identify a background within a digital pathology slide to ensure tissue segments are not overlooked.

According to one embodiment, the optimized image platform 135 may include an image intake module 136, a pixel identifier platform 137, and an output interface 138. The optimized image platform 135 may receive a plurality of electronic images and apply the machine learning model determine updated colors for one or more pixels in an image based on a user's color impairment. For example, the plurality of electronic images may be received from any one or any combination of the server systems 110, physician servers 121, hospital servers 122, clinical trial servers 123, research lab servers 124, and/or laboratory information systems 125. The image intake module 136 may receive WSI's corresponding to one or more patients/individuals.

The pixel identifier platform 137 may then determine, using a rules-based system or artificial intelligence, optimal pixel colors for the one or more inserted images from the image intake module 136. According to one embodiment, the pixel identifier platform 137 may include a color impairment module 141, a pixel transformation identifier module 142, and a pixel transformer module 143. The pixel identifier platform 137, according to one embodiment may receive one or more digital medical images, identify a color impairment of a user, determine a pixel transformation, and apply a pixel transformation to one or more digital medical images. For example, the digital medical images may be received from any one or any combination of the server systems 110, physician servers 121, hospital servers 122, clinical trial servers 123, research lab servers 124, and/or laboratory information systems 125, training image platform 131, or optimized image platform 135. Examples of digital pathology images may include (a) digitized slides stained with a variety of stains, such as (but not limited to) H&E, Hematoxylin alone, IHC, molecular pathology, etc.; and/or (b) digitized image samples from a 3D imaging device, such as micro-CT.

The color impairment module 141 may be capable of receiving one or more impaired vision diagnosis related to one or more patients/individuals. The diagnosis may be received by may be received from any one or any combination of the server systems 110, physician servers 121, hospital servers 122, clinical trial servers 123, research lab servers 124, and/or laboratory information systems 125. Further, the color impairment module 141 may be capable of administering a color impairment test to one or more users as discussed further in the application below. A user may be able to utilize a device such as a screen, monitor, web browser, etc. to access and take the test to determine the color impairment.

The pixel transformation identifier module 142 may be capable of determining a pixel transformation based on the color impairment received from color impairment module 141. The pixel transformation identifier module 142 may be capable of receiving a corresponding stain type that corresponds to the images received from image intake module 136. This stain type may be received by may be received by may be received from any one or any combination of the server systems 110, physician servers 121, hospital servers 122, clinical trial servers 123, research lab servers 124, and/or laboratory information systems 125. Then, based on the stain type and color impairment, the pixel transformation identifier module 142 may be able to output a pixel transformation to perform on the one or more images received in the image intake module 136. The pixel transformation identifier module 142 may determine the pixel transformation using a rules-based algorithm or using machine learning techniques as discussed further below. The pixel transformation identifier module 142 may output a transformation to apply to the pixel transformer module 143.

According to one embodiment, the pixel transformer module 143 may be capable of performing a pixel transformation on the one or more images received in the image intake module 136. The pixel transformer module 143 may be capable of applying a color space transformation or a Look-Up Table ("LUT") transformation approach as discussed further below. For example, the system may have a LUT corresponding to each color impairment discussed herein.

The output interface 138 may be used to output the images created with an updated pixel scheme in the pixel transformer module 143. These may be outputted to a user such as a pathologist to their device (e.g., to a screen, monitor, storage device, web browser, etc.). The output interface 138 may also be responsible for saving the updated images to the one or more storage devices 109 or uploaded the images to the network 120.

Any of the above devices, tools, and modules may be located on a device that may be connected to an electronic network 120, such as the Internet or a cloud service provider, through one or more computers, servers, and/or handheld mobile devices.

Figure 2:
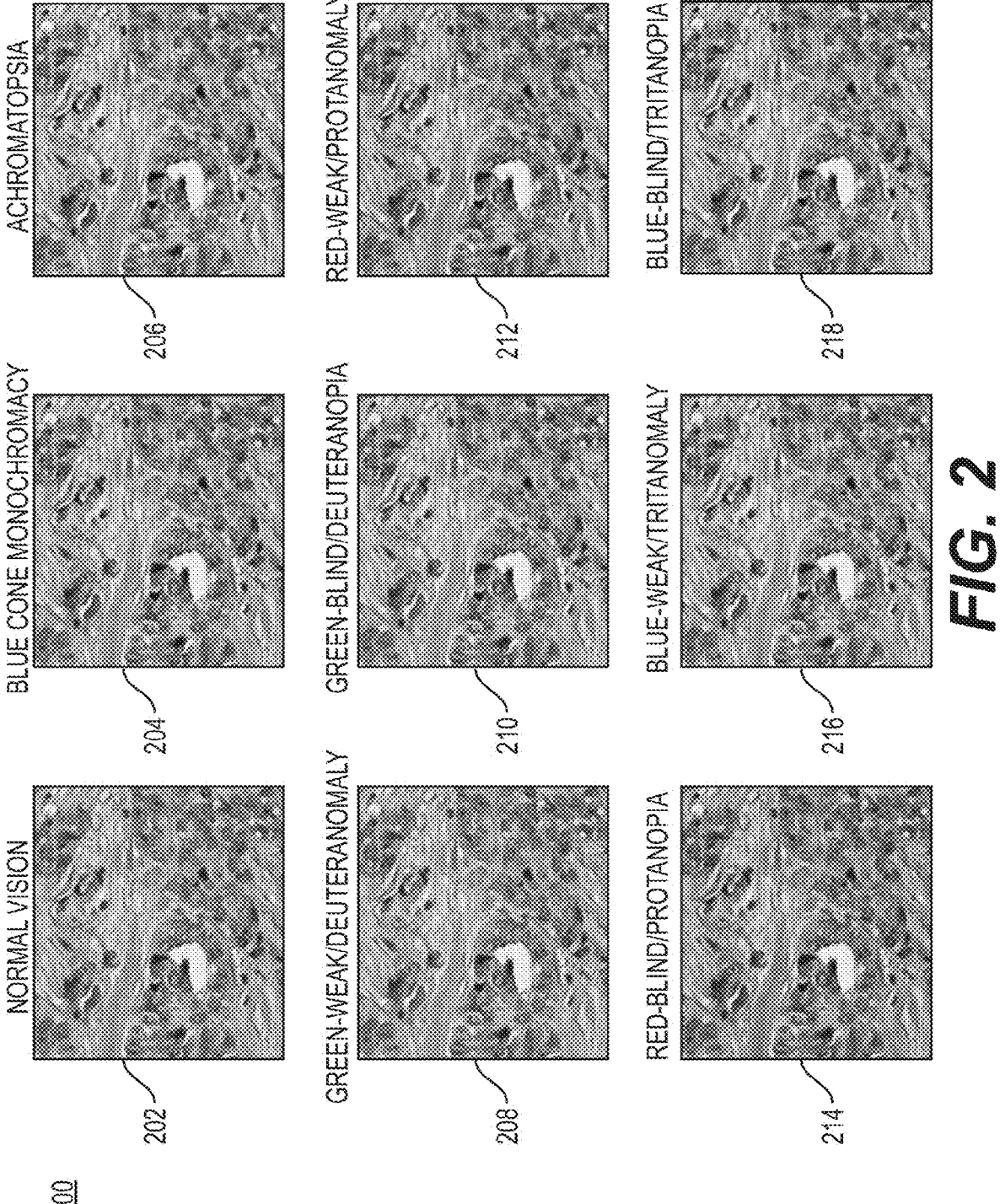
FIG. 2 illustrates a digital histology image that has been synthetically altered to resembled how the image would be perceived under various forms of impaired color perception.

FIG. 2 illustrates a digital histology image 200 of invasive ductal breast carcinoma that has been synthetically altered to resemble how the image may be perceived by individuals having various forms of impaired color perception. The visual impairments depicted in FIG. 2 may be exemplary impairments that embodiments of the system described herein may receive. FIG. 2 depicts an exemplary image 202 of an invasive ductal breast carcinoma as seen by an individual with no visual impairments. FIG. 2 further depicts various images that are altered to resemble how the image may be perceived by an individual with various impairments. This includes an image 204 with blue cone monochromacy, an image 206 with achromatopsia, an image 208 with green-weak/Deuteranomaly, an image 210 green-blind/Deuteranopia, an image 212 with red-weak/Protanomal, an image 214 with red-blind/protanopia, an image 216 with blue-weak/tritanomaly, and an image 218 with blue-blind/tritanopia.

The top left image 202 may include purple/blue/pink hues and depict how an individual with no visual impairment views the example histology slide. Individuals may include three types of cones, red, green, and blue, that may be used for color vision. Image 204, may depict how an individual with blue cone monochromacy views the image 202. An individual with blue cone monochromacy may be able to see blue normally, but both the red and green cones may not function properly. Image 206 may depict how an individual with achromatopsia views the image 202. Achromatopsia impairment may include partial or total absence of color vision and individuals with Achromatopsia may be unable to perceive color and may see only black, white, and shades of gray. Image 208 may depict how an individual with green-weak/Deuteranomaly views the image 202. With deuteranomaly, an individual's green cones in the eye may detect too much red light and not enough green light. This may lead to red, yellow, green, and brown appearing as more similar colors. Image 210, may depict how an individual with green-blind deuteranopia may view image 202. Individuals with deuteranopia may be unable to utilize their green cone cells. An individual may be unable to distinguish between red and green pigments. Image 212, may depict how an individual with red-weak/protanomaly views image 202. When an individual has protanomaly, the individual may view any redness in an image more weakly. Image 214, may depict how an individual with red-blind/protanopia views an image. This may be a more severe version of protanomaly, where an individual is insensitive to red light, causing the colors of green, reds, and yellow to appear less distinguishable to one another. Image 216, may depict how an individual with blue-weak/Tritanomaly views image 202. Tritanomaly may be when an individual's blue cones do not detect enough light. Individuals with tritanomaly may confuse blue with green and yellow with violet. Image 218, may depict how an individual with blue-blind/tritanopia views image 202. Tritanopia may be a more severe form of trinanomaly where an individual has insensitivity to blue light. This may cause even greater confusion between first, blue and green lights and second, yellow and violet.

The systems and methods described herein may overcomes the limitations of colorblindness by using artificial intelligence, image processing, and/or computer vision techniques to modify one or more digital images such that they become optimally interpretable to a specific person and/or specific color impairments. Optimally interpretable may mean the images pixel colors are adjusted to new colors that are more easily distinguishable to one or more users. An optimally interpretable set of image pixels may be different for each type and degree of impaired color vision.

Each human viewer with impaired color vision may have their color perception impaired in distinct ways. This may have occurred due to inherited color vision deficiency where one of the three cones is altered in its spectral sensitivity. This invention may first determines the color perception abilities of a user and then second, personalizes the visualization of histology imagery for them. This personalization/alteration can be performed on different histology stains.

Figures 3, 4:
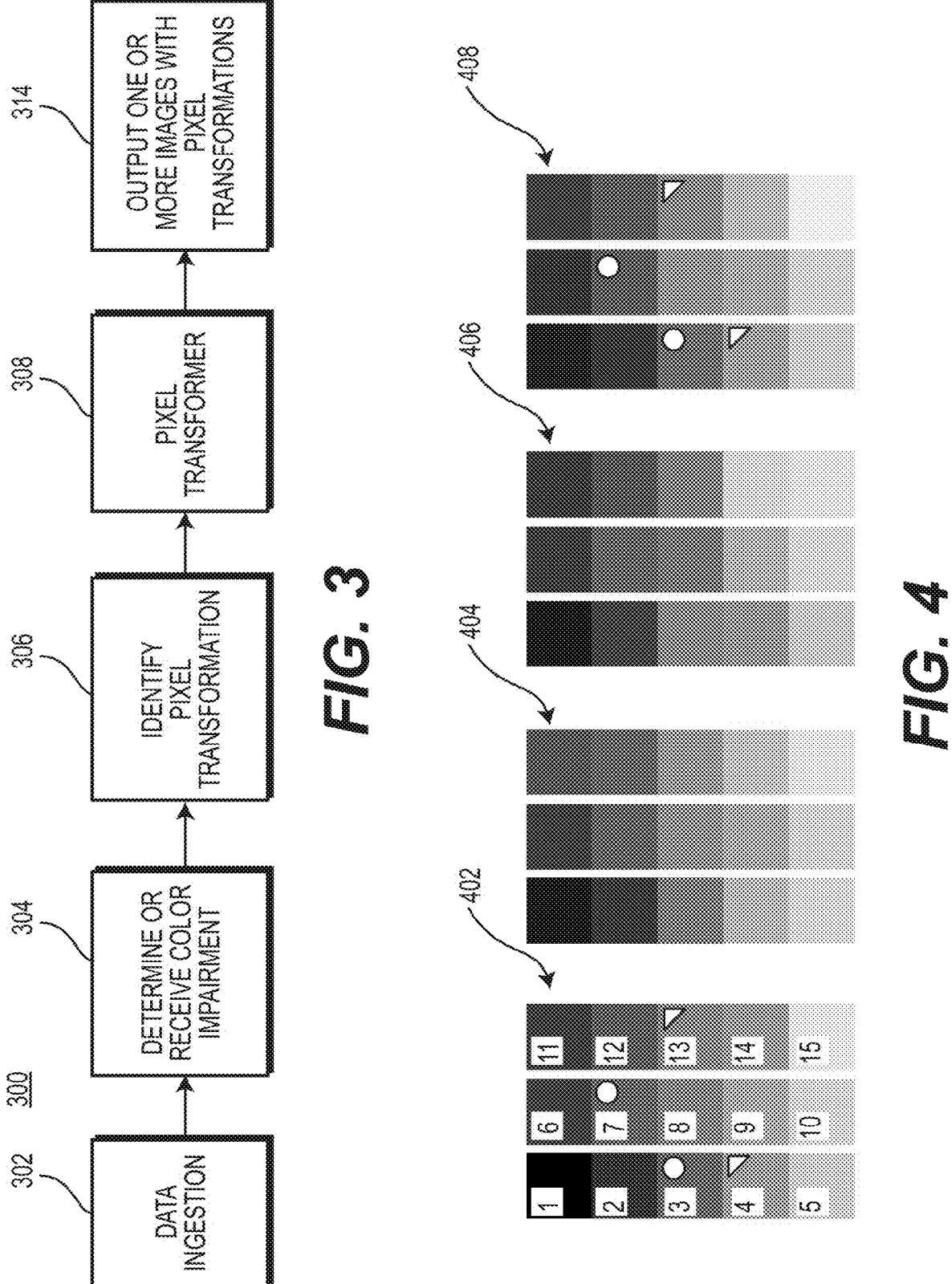
FIG. 3 illustrates a flow diagram illustrating an exemplary process for using a trained system to optimize the color of images, according to techniques presented herein.
FIG. 4 illustrates an exemplary color palette that has been altered based on various color impairments.

FIG. 3 is a flow diagram 300 illustrating an exemplary process for using a trained system (e.g., the slide analysis tool 101) to determine and optimize the pixel color of one or more images. The trained system may be implemented by the pixel identifier platform 137. The pixel identifier platform 137 may identify a color impairment of one or more users. Based on the color impairment and type of stained slides that the pixel identifier platform 137 receives, the pixel identifier platform 137 may determine an optimal pixel transformation to perform, as discussed further below. Last, the pixel identifier platform 137 may update the pixels of the received images using either a LUT or color space approach as discussed further below. The image with updated pixel colors may be an image that maximizes color discrimination abilities. For instance, the updated color palette/applied color transformation may only include colors that a user can clearly distinguish.

At step 302, the system (e.g., the optimized image platform 135) may receive one or more digital pathology images (e.g., a WSI). Further, in one example the system may receive the stain type for each of the received images. This may be received and stored as metadata. In another example, the system may be capable of applying an artificial machine learning on the inputted images to determine and save the stain type of the received digital pathology images.

At step 304, the system (e.g., the color impairment module 141) may determine the color impairment of one or more users that plan to use the system. There are multiple ways to determine the spectral (color) discrimination abilities of a user of the system such as a comprehensive eye examination. In one example, a user may be able to enter the color impairment into the system. A user may be able to interact with a user interface through a computer, phone, or any electronic interface that interacts with the system. A user may type their color impairment into the system. Alternatively, the user may select from a dropdown list that includes all color impairments described in FIG. 2. Additionally, an individual such as a doctor, lab administrator, or other professional may enter the color impairment on behalf of the system's future users. The system may save a user's color discrimination abilities for future use of the system into one or more storage devices 109.

In another example, the system may be capable of administering a test to a user to determine the user's color impairment. This may be done if the user is aware of believe they may have a color impairment, but the user does not know what particular color impairment they have. The system may be capable of administering a color plate test (e.g., a ishihara test or a Hardy, Rand, and Rittler test), an anomaloscope test (wherein a user may utilize an anomaloscpe that is connected to the system through network 120 or directly linked to the tissue viewing platform 100), a hue test (e.g., the Fansworth-Munsell 100-hue test), or a spectral sensitivity test (e.g., a color matching test). The output of the test may then be saved to system storage 109.

At step 306, the system (e.g., the pixel transformation identifier module 142) may determine a pixel transformation for the one or more images inputted at step 302 based on the color impairment determined at step 304.

In one example, the system may have a particular pixel transformation saved for each potential visual impairment described in FIG. 2. For example, each color impairment discussed in FIG. 2 may have a corresponding LUT or colorspace. In another example, a corresponding LUT or colorspace may be created for a particular individual based on a color impairment test score.

The system may be capable of saving the pixel transformations for a particular user. For example, if a user of the system has blue cone monochromacy as a visual impairment and the system described herein has determined a particular pixel transformation to apply to digital medical images (e.g., a particular LUT table to apply), the system may save the pixel identifier transformation to one or more storage devices 109 or upload the transformation to the network 120. In the future, the user may be able to use the trained system, and the system, once aware of the particular user, may proceed with applying to saved pixel transformation to any digital images that the user selects to view/analyze.

In another example, the system may output multiple pixel transformations and allow the user to select a pixel transformation to apply. For instance, the system may output multiple example palates to a user through an output interfaces such as the viewing application tool 108 (e.g., on a screen, a monitor, a storage device, and/or a web browser, etc.). The example palates may have each been created through a unique LUT table or color space transformation. The user may then have the ability to select the example palate of their preference. The system may then record what pixel transformation approach was applied to create the palate and save the pixel transformation as the preferred pixel transformation for the user.

Additionally, at step 306 a user or system administer may have the option to select whether to utilize a color space conversion approach or a LUT table to perform the pixel transformation. In another example, the system may have a color space approach automatically applied. In another example, the system may have a LUT table approach automatically applied.

At step 308, the system (e.g., the pixel transformer module 143) may apply a transformation to convert one or more medical images to an alternative visualization that maximizes the individual user's ability to discriminate among the colors within the image. This approach may require the system to create a mapping for each stain type that maps from pixels with that stain to an alternative pixel representation that maximizes color discrimination abilities of the user. The pixel transformer module may apply either a LUT or a color conversion to perform the transformation of the one or more images. Further, the LUT or color conversion may be created for a particular individual and/or a for a particular color deficiency.

A LUT may be a table of numerical values that may be used to alter an image's visual properties. The system may be capable of receiving as input, the RGB values of each pixels, and then determining the updated RBG valued based on the LUT. In some cases, the LUT may not have an exact value for each potential RGB value. In these cases, the system may apply an interpolation algorithm to generate results for values that are between table values. LUTs may permit a non-linear mapping of the colors in a histopathology slide to maximize the discriminative abilities of a user. Applying a LUT may provide more flexibility compared to a color space conversion, however, it may involve more computations.

For example, the system may create multiple LUT's and allow a user to select a preferred LUT table.

The system may be trained, for example using artificial intelligence (AI) to map inputs of test performance to a specific series of color transformations that maximize performance. In such an AI-based embodiment, an LUT might not be used at all. In one example, AI may be utilized to fit a color conversion module. This may include using an image recoloring algorithm that is optimized to enhance morphology based on the specific deficiencies of a user. In another example, AI may utilize semantic segmentation, wherein AI is utilized to identify the category of each pixel. Next, the system may display pixels of specific categories using a set of colors that may be distinguished by a person with a specific color perception deficiency.

In another example, at step 308 the system (e.g., the pixel transformer module 143) may utilize a custom color space conversion. A color space may refer to a specific organization of colors. A color space conversion may refer to the translation of the representation of a color from one color space to an alternative color space. The conversion from a particular color space to an alternative color space may preserve morphology while making morphological aspects that are difficult to see for individuals with color impairments. In some color space examples, a color space transformation may be a simple linear or non-linear mapping of each pixel to an alternative visualization. Applying colors space transformation may be desired if compute is limited for the system.

At step 314, the system (e.g., the output interface 138) may output the transformed digital image to a user on a monitor or other display device. Further, the transformed digital image may be saved within the system or may be transferred to an alternative computer or network.

FIG. 4 illustrates exemplary color palettes that have been altered based on various color impairments. Palette 402 depicts an exemplary fifteen-color palette. Regarding the R, G, and B score, zero may represent zero light of the color red, green, or blue. A score of 255 may represent the maximum light level for either red, green, or blue. The light level score (e.g., the score from 0-255) may be referred to as the intensity value. The graph below may represent the R, G, B score corresponding to palette 402.

| | R | G | B |
|---|---|---|---|
| 1 | 0 | 0 | 0 |
| 2 | 0 | 73 | 73 |
| 3 | 0 | 146 | 146 |
| 4 | 255 | 109 | 182 |
| 5 | 255 | 182 | 219 |
| 6 | 73 | 0 | 146 |
| 7 | 0 | 109 | 219 |
| 8 | 182 | 109 | 255 |
| 9 | 109 | 182 | 255 |
| 10 | 182 | 219 | 255 |
| 11 | 146 | 0 | 0 |
| 12 | 146 | 73 | 0 |
| 13 | 219 | 109 | 0 |
| 14 | 36 | 255 | 36 |
| 15 | 255 | 255 | 109 |

Palette 404 may represent palette 402 as seen by an individual with deuteranopia. The graph below may represent the R, G, B score corresponding to palette 404, with the numerical sequence corresponding to the numerical sequence of palette 402.

| | R | G | B |
|---|---|---|---|
| 1 | 0 | 0 | 0 |
| 2 | 27 | 27 | 26 |
| 3 | 115 | 122 | 149 |
| 4 | 180 | 180 | 182 |
| 5 | 212 | 213 | 219 |
| 6 | 0 | 55 | 150 |
| 7 | 6 | 102 | 224 |
| 8 | 110 | 151 | 255 |
| 9 | 139 | 169 | 255 |
| 10 | 199 | 211 | 255 |
| 11 | 98 | 89 | 0 |
| 12 | 114 | 104 | 0 |
| 13 | 172 | 157 | 0 |

-continued

| | R | G | B |
|---|---|---|---|
| 14 | 223 | 205 | 6 |
| 15 | 255 | 250 | 98 |

Palette 406 may represent palette 402 as seen by an individual with protanopia. The graph below may represent the R, G, B score corresponding to palette 406, with the numerical sequence corresponding to the numerical sequence of palette 402.

| | R | G | B |
|---|---|---|---|
| 1 | 0 | 0 | 0 |
| 2 | 64 | 66 | 71 |
| 3 | 134 | 136 | 147 |
| 4 | 137 | 147 | 186 |
| 5 | 192 | 198 | 221 |
| 6 | 0 | 35 | 151 |
| 7 | 35 | 106 | 223 |
| 8 | 63 | 131 | 255 |
| 9 | 152 | 177 | 255 |
| 10 | 206 | 215 | 255 |
| 11 | 66 | 60 | 2 |
| 12 | 97 | 88 | 0 |
| 13 | 146 | 134 | 0 |
| 14 | 255 | 234 | 0 |
| 15 | 255 | 253 | 96 |

Palette 408 may represent palette 402 as seen by an individual with tritanopia. The graph below may represent the R, G, B score corresponding to palette 408, with the numerical sequence corresponding to the numerical sequence of palette 402.

| | R | G | B |
|---|---|---|---|
| 1 | 0 | 0 | 0 |
| 2 | 15 | 70 | 89 |
| 3 | 25 | 139 | 179 |
| 4 | 250 | 118 | 142 |
| 5 | 252 | 185 | 196 |
| 6 | 58 | 50 | 52 |
| 7 | 0 | 123 | 163 |
| 8 | 167 | 137 | 142 |
| 9 | 103 | 187 | 225 |
| 10 | 179 | 220 | 242 |
| 11 | 146 | 0 | 46 |
| 12 | 149 | 65 | 80 |
| 13 | 222 | 96 | 119 |
| 14 | 93 | 224 | 255 |
| 15 | 255 | 236 | 240 |

As may be apparent, certain palette colors may appears to be very similar and hard to differentiate for an individual with a color impairment. For example, palate spots three and seven for an individual with tritanopia may appear very similar (e.g., as depicted in palette 408). Because of this, the system described herein may create color space and/or LUT tables that avoids having a stain color with an RGB score of both, or within a predetermined distance of, 0, 146, 146 for an individual with tritanopia.

FIG. 5 is a flowchart illustrating an example method of applying a transformation to digital medical images, according to techniques presented herein. The method 500 of FIG. 5 depicts steps that may be performed by, for example, the slide analysis tool 101 as described above in FIG. 1C. Alternatively, the method may be performed by an external system. Flowchart/method 500 depicts steps to transform a digital medical image's color pixels as described in further detail in steps 502-512.

At step 502, the system (e.g., the image intake module 136) may receive a digital image of a stained histology image and further store the image within a storage device. The system may receive the digital image from user input or the system may be provided an array of images from an alternative system. The user may manually, or the system may automatically, select a specific image to be altered.

At step 504, the system (e.g., the image intake module 136) may apply staining normalization to the image. This may be performed in a variety of ways. In one embodiment, multispectral information may be used to normalize staining conditions. In another embodiment, the pattern classification and recognition algorithms may be utilized to map the stained RGB colors of the pixels. In another embodiment, the normalization method may convert the image to RGB vector, and/or utilize a LUT to map to convert a pixel's respective RGB values.

At step 506, the system (e.g., the image intake module 136) may determine the state type or disease used for the digital medical image. In one example, ML techniques such as semantic segmentation may be utilized by the system to determine the state type and/or disease for the digital medical images. In another example, this may inputted or selected by a user. An exemplary state type may be lung cancer of kidney cancer.

At step 508, the system may identify the appropriate pixel transformation to adjust the digital image based on the stain type for the user. This may include first, identifying the color impairment for the user using the techniques discussed at step 304. Then the system may identifying the pixel transformation using the techniques discussed at step 306. The system may allow for a user to select from a variety of pixel transformation options. This may include allowing a user to select a LUT from a variety of LUT tables presented to a user in palette form.

At step 510, the system (e.g., the pixel transformer module 143) may apply the pixel transformation to each pixel in the image. This may be done using the steps discussed at step 308. If at step 508, a LUT-based approach was determined, the system's transformation may involve replacing each pixel with the appropriate value in the LUT. If a color space approach was determined at step 508, then the transformation may involve converting from the color space of the image to the alternative color space via a linear or non-linear transformation.

At step 512, the system (e.g., the output interface 138) may output the transformed digital image to a user on a monitor or other display device. Further, the transformed digital image may be saved within the system or may be transferred to an alternative computer or network.

FIG. 6 is a flowchart illustrating an example method for determining a pixel transformation for one or more users with a color impairment.

At step 602, the system may receive one or more of medical images of at least one pathology specimen, the pathology specimen being associated with a patient, wherein the medical image is a stained histology image.

At step 604, the system may receive a stain type associated with the one or more medical images.

At step 606, the system may identify a color vision deficiency for one or more users.

At step 608, the system may identify a pixel transformation for the one or more medical images based on the stain type and color vision deficiency of the one or more users.

At step 610, the system may apply a pixel transformation to each pixel within the one or more medical images.

At step 612, the system may display the transformed one or more medical images to the one or more users.

Figure 7:
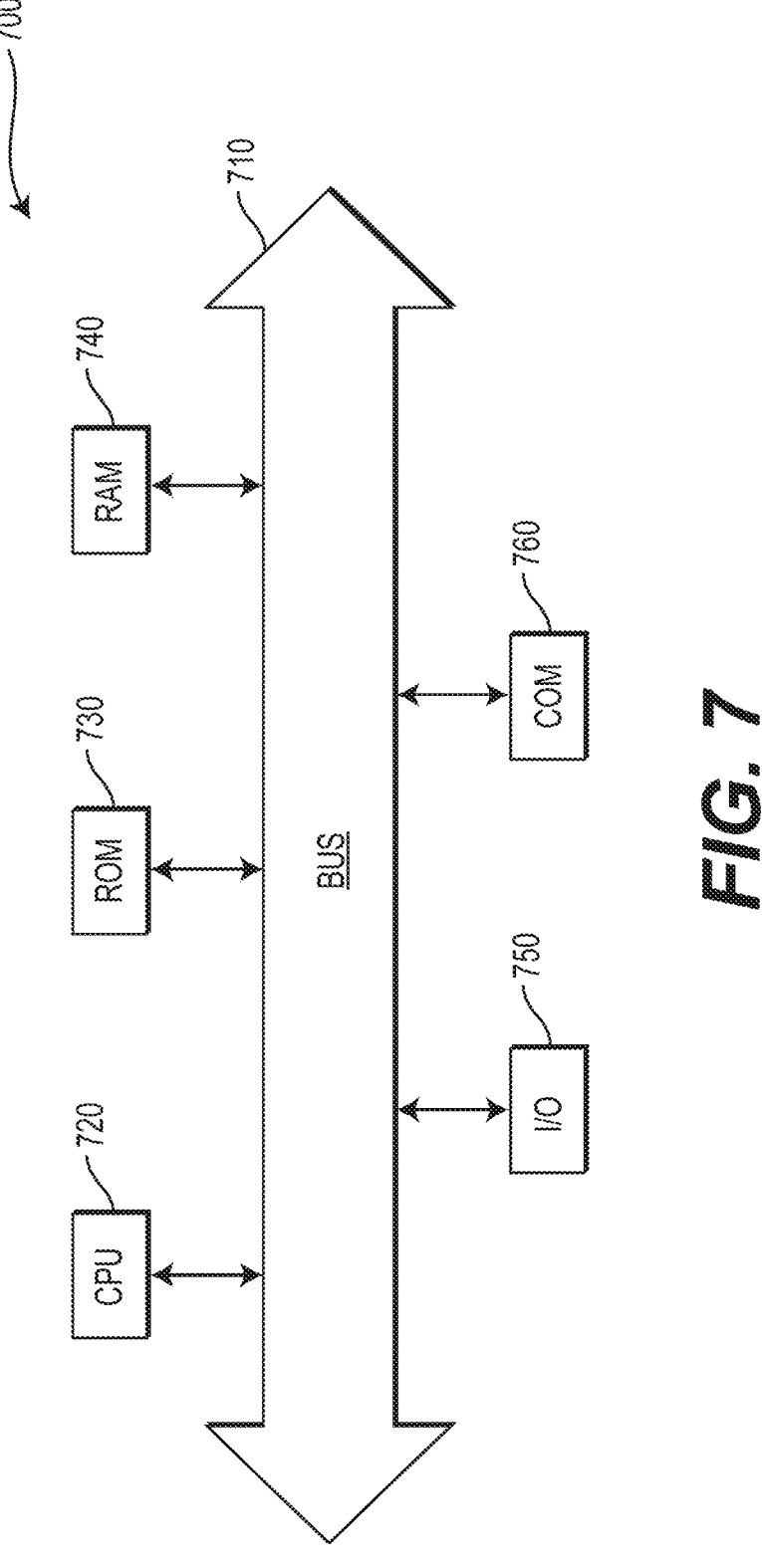
FIG. 7 depicts an example of a computing device that may execute techniques presented herein, according to one or more embodiments.

As shown in FIG. 7, device 700 may include a central processing unit (CPU) 720. CPU 720 may be any type of processor device including, for example, any type of special purpose or a general-purpose microprocessor device. As will be appreciated by persons skilled in the relevant art, CPU 720 also may be a single processor in a multi-core/multi-processor system, such system operating alone, or in a cluster of computing devices operating in a cluster or server farm. CPU 720 may be connected to a data communication infrastructure 710, for example a bus, message queue, network, or multi-core message-passing scheme.

Device 700 may also include a main memory 740, for example, random access memory (RAM), and also may include a secondary memory 730. Secondary memory 730, for example a read-only memory (ROM), may be, for example, a hard disk drive or a removable storage drive. Such a removable storage drive may comprise, for example, a floppy disk drive, a magnetic tape drive, an optical disk drive, a flash memory, or the like. The removable storage drive in this example reads from and/or writes to a removable storage unit in a well-known manner. The removable storage may comprise a floppy disk, magnetic tape, optical disk, etc., which is read by and written to by the removable storage drive. As will be appreciated by persons skilled in the relevant art, such a removable storage unit generally includes a computer usable storage medium having stored therein computer software and/or data.

In alternative implementations, secondary memory 730 may include similar means for allowing computer programs or other instructions to be loaded into device 700. Examples of such means may include a program cartridge and cartridge interface (such as that found in video game devices), a removable memory chip (such as an EPROM or PROM) and associated socket, and other removable storage units and interfaces, which allow software and data to be transferred from a removable storage unit to device 700.

Device 700 also may include a communications interface ("COM") 760. Communications interface 760 allows software and data to be transferred between device 600 and external devices. Communications interface 760 may include a modem, a network interface (such as an Ethernet card), a communications port, a PCMCIA slot and card, or the like. Software and data transferred via communications interface 760 may be in the form of signals, which may be electronic, electromagnetic, optical or other signals capable of being received by communications interface 760. These signals may be provided to communications interface 760 via a communications path of device 700, which may be implemented using, for example, wire or cable, fiber optics, a phone line, a cellular phone link, an RF link or other communications channels.

The hardware elements, operating systems, and programming languages of such equipment are conventional in nature, and it is presumed that those skilled in the art are adequately familiar therewith. Device 700 may also include input and output ports 750 to connect with input and output devices such as keyboards, mice, touchscreens, monitors, displays, etc. Of course, the various server functions may be implemented in a distributed fashion on a number of similar platforms, to distribute the processing load. Alternatively, the servers may be implemented by appropriate programming of one computer hardware platform.

Throughout this disclosure, references to components or modules generally refer to items that logically may be grouped together to perform a function or group of related functions. Like reference numerals are generally intended to refer to the same or similar components. Components and/or modules may be implemented in software, hardware, or a combination of software and/or hardware.

The tools, modules, and/or functions described above may be performed by one or more processors. "Storage" type media may include any or all of the tangible memory of the computers, processors or the like, or associated modules thereof, such as various semiconductor memories, tape drives, disk drives and the like, which may provide non-transitory storage at any time for software programming.

Software may be communicated through the Internet, a cloud service provider, or other telecommunication networks. For example, communications may enable loading software from one computer or processor into another. As used herein, unless restricted to non-transitory, tangible "storage" media, terms such as computer or machine "readable medium" refer to any medium that participates in providing instructions to a processor for execution.

The foregoing general description is exemplary and explanatory only, and not restrictive of the disclosure. Other embodiments may be apparent to those skilled in the art from consideration of the specification and practice of the invention disclosed herein. It is intended that the specification and examples be considered as exemplary only.

What is claimed is:

1. A computer-implemented method for processing electronic medical images, comprising:

receiving one or more of medical images of at least one pathology specimen, the pathology specimen being associated with a subject, wherein the one or more medical images are stained histology images;

receiving a stain type associated with the one or more medical images;

identifying a color vision deficiency for one or more users from a plurality of color vision deficiencies;

identifying a pixel transformation for the one or more medical images based on the stain type and color vision deficiency of the one or more users;

applying a pixel transformation to each pixel within the one or more medical images, wherein applying the pixel transformation includes:

applying the pixel transformation for each pixel of the one or more medical images based on an identified look-up table from a plurality of look-up tables, wherein the identified look-up table is determined based on the stain type and color deficiency of the one or more users; or applying the pixel transformation for each pixel of the one or more medical images to convert the one or more medical images to an alternate color space, wherein the alternate color space is determined based on the stain type and color deficiency of the one or more users; and displaying the transformed one or more medical images to the one or more users.

2. The method of claim 1, further comprising:

applying staining normalization to the one or more medical images prior to applying the pixel transformation.

3. The method of claim 1, further comprising:

saving the pixel transformation for a particular user for future use.

4. The method of claim 1, wherein color vision deficiency for one or more users is determined by administering a spectral sensitivity test to the one or more users.

5. The method of claim 1, wherein applying the pixel transformation includes for each pixel of the medical images, updating a corresponding red, green, blue (RGB) intensity value based on the identified look-up table.

6. The method of claim 1, wherein multiple pixel transformations may be created for a particular user and the user may select what pixel transformation to apply.

7. The method of claim 1, wherein applying the pixel transformation for each pixel of the one or more medical images based on the identified look-up table includes:

determining whether each pixel of the one or more medical images has an exact value in the identified look-up table; and for pixels that do not have an exact value in the look-up table, applying an interpolation to generate red, green, blue (RGB) intensity values for the pixels; and updating red, green, and blue intensity values for each pixel based on the identified look-up table values and the interpolated values.

8. The method of claim 1, wherein applying the pixel transformation includes:

applying artificial intelligence techniques to apply recoloring algorithms to enhance morphologies in the one or more medical images based on the color vision deficiency for one or more users.

9. The method of claim 1, wherein applying the pixel transformation for each pixel of the one or more medical images to convert the one or more medical images to an alternate color space includes applying a non-linear transformation to the pixels of the one or more medical images.

10. A system for processing electronic digital medical images, the system comprising:

at least one memory storing instructions; and at least one processor configured to execute the instructions to perform operations comprising:

receiving one or more of medical images of at least one pathology specimen, the pathology specimen being associated with a subject, wherein the one or more medical images are stained histology images;

receiving a stain type associated with the one or more medical images;

identifying a color vision deficiency for one or more users from a plurality of color vision deficiencies;

identifying a pixel transformation for the one or more medical images based on the stain type and color vision deficiency of the one or more users;

applying a pixel transformation to each pixel within the one or more medical images, wherein applying the pixel transformation includes:

applying the pixel transformation for each pixel of the one or more medical images based on an identified look-up table from a plurality of look-up tables, wherein the identified look-up table is determined based on the stain type and color deficiency of the one or more users; or applying the pixel transformation for each pixel of the one or more medical images to convert the one or more medical images to an alternate color space, wherein the alternate color space is determined based on the stain type and color deficiency of the one or more users; and displaying the transformed one or more medical images to the one or more users.

11. The system of claim 10, further comprising:

applying staining normalization to the one or more medical images prior to applying the pixel transformation.

12. The system of claim 10, further comprising:

saving the pixel transformation for a particular user for future use.

13. The system of claim 10, wherein color vision deficiency for one or more users is determined by administering a spectral sensitivity test to the one or more users.

14. The system of claim 10, wherein applying the pixel transformation includes for each pixel of the medical images, updating a corresponding red, green, blue (RGB) intensity value based on the identified look-up table.

15. The system of claim 10, wherein multiple pixel transformations may be created for a particular user and the user may select what pixel transformation to apply.

16. The system of claim 10, wherein applying the pixel transformation for each pixel of the one or more medical images based on a look-up table includes:

determining whether each pixel of the one or more medical images has an exact value in the identified look-up table; and for pixels that do not have an exact value in the look-up table, applying an interpolation to generate red, green, blue (RGB) intensity values for the pixels; and updating red, green, and blue intensity values for each pixel based on the identified look-up table values and the interpolated values.

17. The system of claim 10, wherein applying the pixel transformation includes:

applying artificial intelligence techniques to apply recoloring algorithms to enhance morphologies in the one or more medical images based on the color vision deficiency for one or more users.

18. The system of claim 10, wherein applying the pixel transformation for each pixel of the one or more medical images to convert the one or more medical images to an alternate color space includes applying a non-linear transformation to the pixels of the one or more medical images.

19. A non-transitory computer-readable medium storing instructions that, when executed by a processor, perform operations processing electronic digital medical images, the operations comprising:

receiving one or more of medical images of at least one pathology specimen, the pathology specimen being associated with a subject, wherein the one or more medical images are stained histology images;

receiving a stain type associated with the one or more medical images;

identifying a color vision deficiency for one or more users from a plurality of color vision deficiencies;

identifying a pixel transformation for the one or more medical images based on the stain type and color vision deficiency of the one or more users;

applying a pixel transformation to each pixel within the one or more medical images, wherein applying the pixel transformation includes:

applying the pixel transformation for each pixel of the one or more medical images based on an identified look-up table from a plurality of look-up tables, wherein the identified look-up table is determined based on the stain type and color deficiency of the one or more users; or applying the pixel transformation for each pixel of the one or more medical images to convert the one or more medical images to an alternate color space, wherein the alternate color space is determined based on the stain type and color deficiency of the one or more users; and displaying the transformed one or more medical images to the one or more users.

20. The computer-readable medium of claim 19, further comprising:

applying staining normalization to the one or more medical images prior to applying the pixel transformation.

\* \* \* \* \*